Feb. 7, 1928.
G. F. BAHR
1,658,182
STOP MECHANISM
Filed March 19, 1927
2 Sheets-Sheet 1
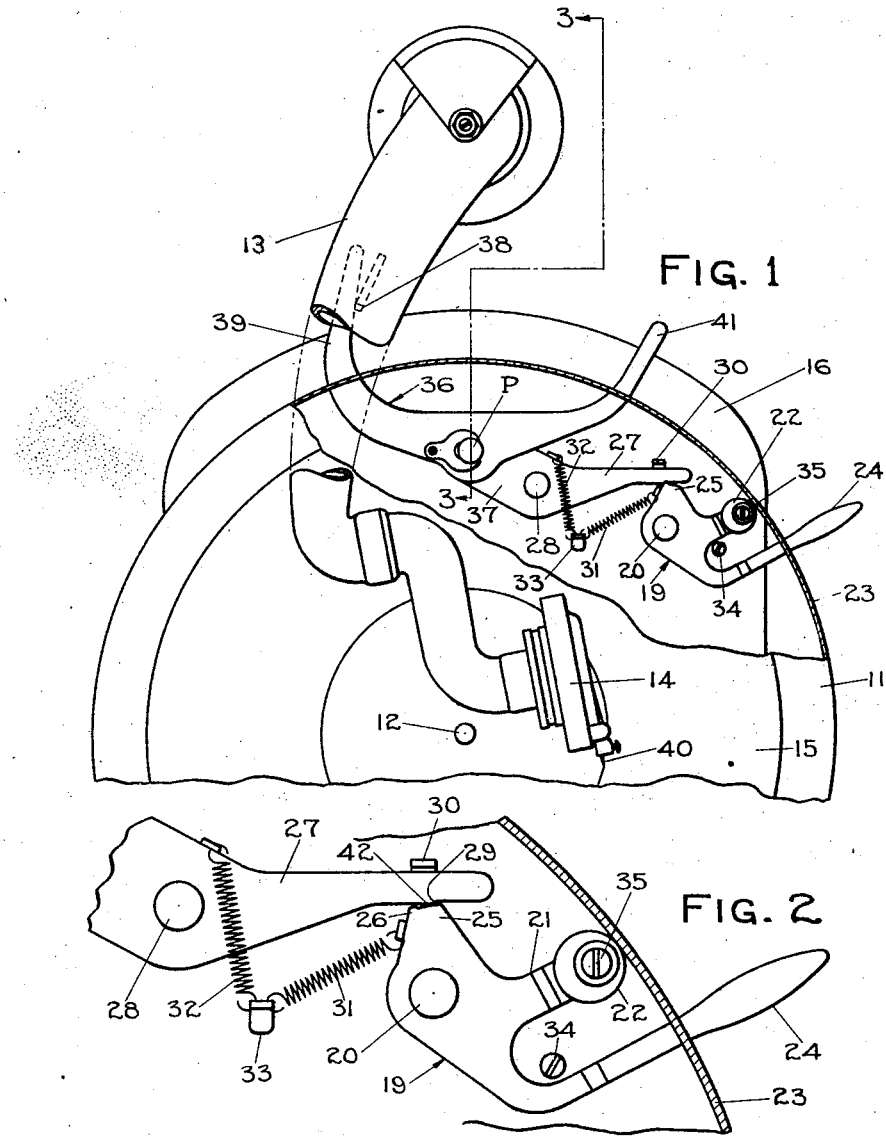
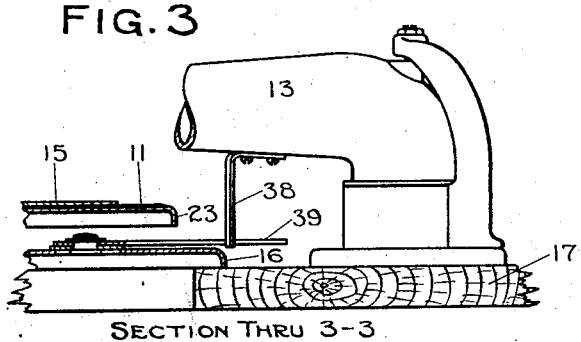
INVENTOR
GUSTAVE F. BAHR
BY
John A. Hanrahan
ATTORNEY Feb. 7, 1928.
G. F. BAHR
1,658,182
STOP MECHANISM
Filed March 19, 1927
2 Sheets-Sheet 2
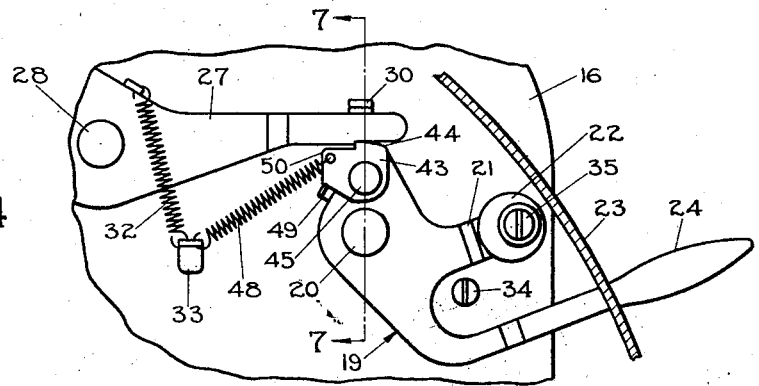
FIG. 4
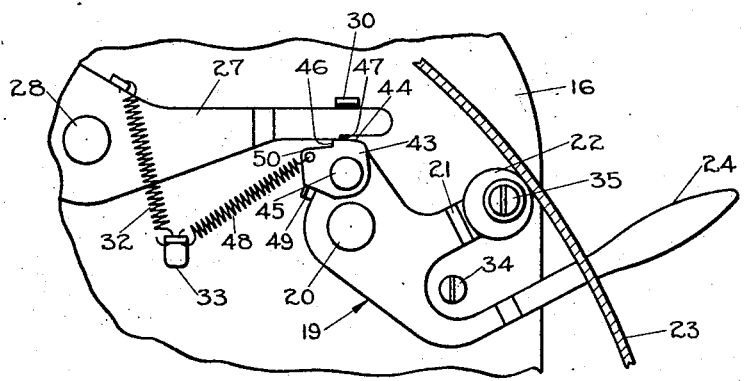
FIG. 5
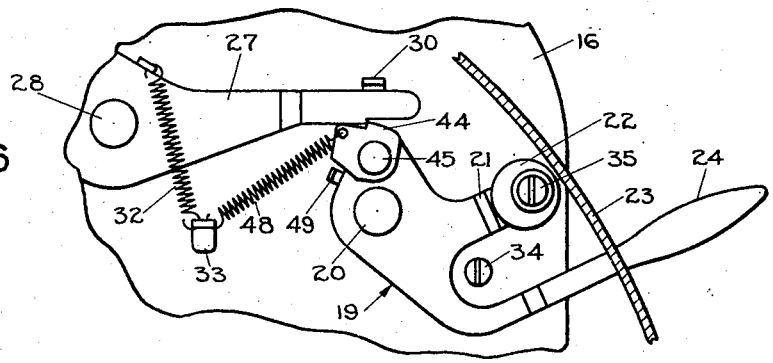
FIG. 6
FIG. 7
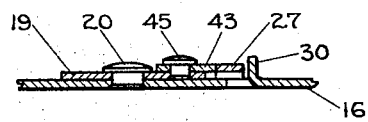
SECTION THRU 7-7
INVENTOR
GUSTAVE F. BAHR
BY
John H Hanrahan
ATTORNEY Patented Feb. 7, 1928.

1,658,182

UNITED STATES PATENT OFFICE.

GUSTAVE F. BAHR, OF BRIDGEPORT, CONNECTICUT, ASSIGNOR TO COLUMBIA PHONO-GRAPH COMPANY, INC., OF BRIDGEPORT, CONNECTICUT, A CORPORATION OF NEW YORK.

STOP MECHANISM.

Application filed March 19, 1927. Serial No. 176,632.

This invention relates to new and useful improvements in stop or brake mechanisms, and has particular reference to such mechanisms when applied to phonographs, talking machines or the like.

An object of the invention is to provide a mechanism of the character stated, which comprises a minimum number of parts.

Another object is to provide a stop mechanism of the character indicated which may be set to be operated automatically and which may also be manually operated either after the automatic mechanism has been disrupted or without disrupting such mechanism.

A further object of the invention is to provide a mechanism of the character indicated, wherein co-operating latch and catch parts are provided with engaging surfaces together with means whereby slight pressure, manually delivered, will bring about a camming action, and one of said surfaces will be forced away from the other so as to permit of relative movement of said parts under the action of an elastic means to apply the brake.

An additional object is to provide a novel means of adjustment whereby the brake pad may be properly set initially, as, for instance, at the factory, and which may also be adjusted to compensate for wear.

A still further object is to provide means to compensate for looseness in the parts and thereby prevent premature release of the brake and the stopping of the turntable before the needle reaches the end of the record.

With the foregoing and other objects in view, as will become more apparent as the description proceeds, the invention resides in certain combinations and arrangements of elements, as will be hereinafter more fully explained, and particularly pointed out in the appended claims, to which reference must be had for a definition of the limitations of the invention.

In the accompanying drawings forming part of this specification—

Fig. 1 is a plan view of the stop mechanism, showing the same in released or "off" position, parts of the phonograph being shown in order to make clear the location and operation of the stop mechanism;

Fig. 2 is a fragmentary plan view on an enlarged scale showing the relative positions of the brake element and latch when the brake is in operative or "on" position;

Fig. 3 is a fragmentary detail sectional view on the line 3—3 of Fig. 1;

Fig. 4 is a fragmentary view showing the parts in the relative positions of Fig. 1 but of a slightly modified form of the invention, wherein the catch portion of the brake element is pivoted thereto rather than rigid or integral therewith;

Fig. 5 is a view similar to Fig. 2 but showing the modified structure;

Fig. 6 is a view similar to Fig. 5 but showing the relation of parts just before the latch and catch portion are disengaged;

Fig. 7 is a sectional view on the line 7—7 of Fig. 4.

Referring in detail to the drawings, wherein for the purpose of illustration, there is shown preferred embodiments of the invention, the cabinet of the phonograph is not shown. However, the usual turn-table 11 is shown as mounted on the spindle 12, driven from a motor, of any preferred type (not shown) in the usual manner.

The tone-arm 13, of any preferred construction, is mounted on the cabinet, and carries a reproducer 14 for cooperation with a record 15. The above parts are usual and of ordinary construction, and have no particular relation to the present invention, except for the purpose of making clear the operation thereof.

For the purpose of illustration, the stop mechanism is mounted on a motor-plate 16, although it will be understood that the device may be used in the nature of an attachment, when it will be mounted on any suitable plate which will be attached to a motor-board 17, or to the motor-plate 16. The motor-plate is secured by suitable screws or other fastening means to the motor-board 17. In the embodiment of the invention shown in Figs. 1 to 3, a brake element 19 is pivotally mounted at 20 to the motor-plate. This brake element has an arm 21 carrying a brake pad 22 of leather or other friction producing material, adapted in its operative position to engage the down-turn flange 23 of the turn-table 11. Also, the brake element is provided with a hand piece 24 formed integral therewith and extending out from under the edge of the turn-table, and offset upwardly for convenience in manipulation.

Disposed at that part of the brake element 19, remote from the hand piece 24, is a catch portion 25, inclined as at 26, to engage a correspondingly inclined shoulder surface on the latch 27.

Latch 27 is pivotally mounted on the motor-plate as at 28, and at its forward end has a portion cut away to provide a shoulder 29 inclined as above stated, and adapted to be engaged by the inclined surface 26 of the catch portion 25 of the brake element 19 to hold the brake in "off" position (see Fig. 1). That portion of the latch 27, beyond the shoulder 29 acts to guide catch portion 25 and to limit the point of engagement between the shoulder 29 and surface 26.

A stop lug 30 is provided above the forward portion of the latch 27 for limiting the upward movement thereof in the automatic operation of the device, as will be hereinafter more fully explained.

Secured at one end to the brake element 19 at a point above its pivot 20 so as to normally urge the brake in an anti-clockwise direction is a coil spring 31. When the brake is in released position, the action of the spring is checked by engagement of the inclined surface 25 with the inclined surface of the shoulder 29. However, as soon as this contact is broken (see Fig. 2) the spring 31 whips the brake element 19 about its pivot 20 and brings the brake pad 22 into frictional engagement with the down-turn flange 23 of the turn-table, thus stopping rotation of the turn-table.

For holding the latch 27 in operative position, that is, in a position to maintain the brake in released position, a spring 32 is provided. One end of this spring, as well as one end of the spring 31, is connected with a suitable pin or anchor 33 carried by the motor-plate. The springs 31 and 32 are of the same, or substantially the same strength.

A stop in the form of a screw 34 or a suitable lug, is provided to limit movement of the brake element 19 in either direction about its pivot. By this means excessive movement of the brake element either under the influence of spring 31 or by the operator manipulating the hand piece, is prevented. Breakage of spring 31 or disruption of the mechanism is thus averted.

Means are provided whereby wear of the brake pad 22 may be compensated for. With this object in view the brake pad is made in the form of a disc eccentrically mounted. By loosening the securing screw 35 the disc or pad may be given a partial rotation to present a higher part for engagement with the turn-table flange when the brake is applied. Also, this construction provides for the proper initial setting of the brake pad. After the adjustment or setting, the screw 35 is of course tightened.

To manually operate the brake, it is but necessary (assuming that the brake is in operative or applied position) to move the hand piece 24 in a clockwise direction, thus moving the pad from engagement with the turn-table and moving the catch portion 25 of element 19 in a position where it will click past the shoulder 29 of the latch 27. Upon releasing the hand piece, spring 31 tends to move the brake element in an anti-clockwise direction, and in doing this causes the inclined surface 26 to engage the shoulder 29 whereby the brake is held in off position. Spring 32 operates to hold latch 27 in position so that its shoulder 29 will be engaged by surface 26 of part 25 of the brake element. To manually apply the brake, application of pressure in an anti-clockwise direction on the hand piece 24 brings about a camming action between the inclined surface 26 and the shoulder 29, resulting in an upward movement of the latch 27 about its pivot 28. Instantly the engaged surface of the latch and catch are separated, the spring 31 moves the brake to operative position.

For the purpose of automatically operating the brake, a bifurcated member 36 is pivoted at P on the upper end 37, or the end remote from the shoulder 29, of the latch 27. There is a frictional connection between the bifurcated member 36 and the part 37 of the latch which permits setting of the bifurcated member in different positions relative to the part 37, but which causes these parts to move as a unit under the pressure ordinarily applied thereto.

A finger 38 is rigid with the tone-arm and upon engaging the arm 39 of the bifurcated member, causes said member together with the latch member to move as a unit about the pivot 28 of the latch member. This movement, which as is obvious, is in an anti-clockwise direction, releases the brake element to permit of its being moved in an anti-clockwise direction to operative position, by the spring 31. Excessive movement of the latch member at this time is prevented by the stop 30.

As is well known, some records are provided with more recording than others, owing to the length of the selection, etc., and to adapt the brake to function automatically with such different records, the frictional connection is provided. This permits of adjustment.

To effect the adjustment, it is but necessary to move the tone-arm inward and place the usual stylus 40 in the last groove of the record, or at a point where it is desired that the brake be applied, and to then grasp the arm 41 of the bifurcated member and move it in a clockwise direction until the arm 39 of said member contacts with the finger 38 on the tone-arm. The frictional connection mentioned permits of the necessary relative movement between the bifurcated member 36 and the latch member 27. Then the sound-box and tone-arm are raised and moved to the beginning of the record, the brake-released manually as above described, and the sound-box lowered to engage the stylus with the record. When the stylus again reaches the point at which the setting operation was performed, the finger 38 will engage the arm 39 of the bifurcated member, move it as a unit with the latch 27 so as to disengage the shoulder 29 from the inclined surface 26 of the catch portion 25 and permit operation of the brake element 19 under the influence of the spring 31.

I have provided a means to prevent premature tripping of the brake. This is accomplished by cutting away a part of the portion 25 immediately in the rear of the surface 26, to provide an arcuate surface 42. The arc is struck from the center of pivot 20. Now, when the brake is in operative position (see Fig. 2) the edge of shoulder 29 will engage the surface 42 and be slightly lower than it would be if the cutout had not been made. When the brake is moved to release the turn-table (see Fig. 1) the slight extra distance the latch 27 is moved, owing to the cut-out, takes up the lost motion or back lash due to the looseness of parts, etc. and the brake will be tripped at exactly the point desired when the setting operation took place. The arcuate surface 42 is flush with the lowest point of the shoulder 29 when the brake is in inoperative position.

The form of invention shown in Figs. 4 through 7 is substantially the same as that shown in Figs. 1 to 3. In fact, there is but one difference, namely, the catch portion 43 is pivoted to the brake element 19, whereas in the figures first described, this part was integral with the brake element. This permits of the use of a better, and therefore, more expensive grade of material for the catch portion. Such material would be hard and wear resisting. Moreover, by having the catch portion separate from and pivoted to the brake element, the said catch portion is renewable. Therefore, when the catch portion wears and tends to release the brake too soon, a new catch portion may be substituted. In addition, the use of inclined engaging surfaces between the catch and latch is made unnecessary and the occasion for the cut-out to produce surface 42 is no longer present. The upper surface portion 44 is arcuate, the center of the arc being the center of pivot 45.

In the figures showing the modified form of the invention, the catch portion 43 is pivoted on the brake element 19 at 45. This portion includes a squared surface 46 adapted to contact with the shoulder 47 of the latch member 27, for the purpose of holding the brake element in off or inoperative position (Fig. 4). A spring 48 of the modified structure is somewhat stronger than the corresponding spring in the form of invention previously described. Such a stronger spring is made necessary, owing to the employment of the pivoted catch portion. To limit movement of the catch portion in an anti-clockwise direction, a finger 49 is struck up from the brake element. This finger, of course, does not, for the purpose of this invention, interfere with the rotation of the catch portion 43 in a clockwise direction.

Movement of the hand piece 24 in that form of the invention just described, in a clockwise direction, bring about a camming action, whereby the latch element 27 is rocked about its pivot 28 in the direction of the stop lug 30. This action is due to the fact that catch portion 43 rocks about its pivot in a clockwise direction and surfaces 46 and 47 tend to move away from each other, and in addition toe 50 of portion 43 strikes latch 27 (Fig. 6) and moves it in an anti-clockwise direction about its pivot 28, thereby separating surfaces 46 and 47. Immediately the surface 46 and shoulder 47 are disengaged, spring 48 acts to rotate the brake element in an anti-clockwise direction and bring about the application of the brake (Fig. 5). The rotation of the brake element in a clockwise direction, by means of the hand piece 24, moves the portion 43 beyond the shoulder 47 so that upon release of the hand piece 24, spring 48 acts to move the surface 46 into engagement with the shoulder 47 so that the brake is held in off position.

Automatic actuation of the brake takes place as in the case of the form of the invention shown in Figs. 1 to 3.

With the invention as shown in Figs. 1 to 3, it is necessary that the parts be most accurately made. A slight miscalculation in the cut of surface 26 or shoulder 29 would make an inoperative device, since these surfaces would not engage with sufficient friction to resist the action of the spring 31. Also, should any pivots be slightly off-center, the same effect would be produced. But with the device shown in Figs. 3 and 4, it is not necessary that the parts be cut and located with such great precision, owing to the use of the pivoted catch portion 43 and the slightly heavier spring 48, together with the straight shoulder 47.

Having thus described the invention, what I claim and desire to secure in Letters Patent, is—

1. In a brake mechanism, a brake element having a catch portion provided with an inclined surface, a latch element having an inclined shoulder adapted for engagement with said inclined portion to hold the brake in off position, means normally urging said latch in the path of said catch portion, other means normally urging said brake to on position, and manually operated means for bringing about a camming action between said inclined surfaces to effect disengagement thereof and permit application of the brake by the first-named means.

2. In a brake mechanism, a brake element, a catch, a pivoted latch, said latch having a portion adjacent said catch cut away to provide a shoulder, means normally urging said brake element to operative position, and said shoulder co-operating with said catch to prevent the functioning of said means.

3. In a brake mechanism, a brake element, a catch, a pivoted latch, said latch having a portion adjacent said catch cut away to provide a shoulder and a guide, means normally urging said brake element to operative position, said shoulder co-operating with said catch to prevent the functioning of said means, and said guide co-operating with said catch to insure its proper engagement with the shoulder.

4. In an adjustable brake mechanism, a brake element, a catch, a pivoted latch having a shoulder to engage said catch, a spring normally urging said brake element to operative position, said shoulder co-operating with said catch to prevent functioning of said spring, means frictionally connected with said latch to move with and relative thereto and adapted to move therewith to separate said shoulder from said catch to permit functioning of said spring, the movement of said means relative to said latch being for the purpose of adjustment when setting the brake, and one of said co-operating parts having means to compensate for looseness in the mounting of said parts to insure proper setting of the brake.

5. In a brake mechanism, a brake element, a catch portion pivoted on said brake element, a pivoted latch, said latch having a shoulder adapted to be engaged by said catch portion to maintain the brake element in inoperative position, means normally holding said latch in position where said shoulder will be engaged by said catch, a spring secured at one end and its other end connected with said catch portion and acting normally to move said brake element to operative position, and manually operable means acting through said catch portion to move said latch to release the brake element to permit the application of the brake under the influence of said spring.

6. In a brake mechanism, a brake element, a catch portion pivoted on said brake element, a pivoted latch, said latch having a shoulder adapted to be engaged by said catch portion to maintain the brake element in inoperative position, a spring secured at one end and at its other end connected with said catch portion and acting normally to move said brake element to operative position, manually operable means acting through said catch portion to move said latch to release the brake element to permit the application of the brake under the influence of said spring, and means for automatically releasing said catch from said latch.

7. In a braking mechanism, a brake pad in the form of a disc, and means mounting said brake pad eccentrically whereby it may be turned on its mounting to compensate for wear and for purpose of securing proper adjustment.

8. In an adjustable brake mechanism, a brake element, a spring normally urging said brake element to operative position, a catch associated with said brake element, a pivoted latch having a shoulder to engage said catch to prevent functioning of said spring, means to disengage said shoulder and catch to permit functioning of said spring, the movement of said means relative to said latch being for the purpose of adjustment when setting the brake, and means to compensate for looseness in said parts to insure proper setting of said brake.

9. In a brake mechanism, a brake element, a catch portion on said brake element, a pivoted latch, said latch having a shoulder adapted to be engaged by said catch portion to maintain the brake element in inoperative position, a spring secured at one end and at its other end connected with said catch portion and acting normally to move said brake element to operative position, and manually operable means acting through said catch portion to move said latch to release the brake element to permit the application of the brake under the influence of said spring.

10. In a stop mechanism, a brake element, a catch portion pivoted thereto and movable in one direction to move the brake element with it and movable in the opposite direction relative to the brake element, a spring secured at one end and connected to said catch portion at its opposite end and tending to move the catch portion and brake element in the direction first mentioned to put the brake in operative position, a latch to engage the catch portion and prevent functioning of the spring, and means to move the brake element in said first direction to bring about a slight movement of the catch portion in said opposite direction to disengage the latch and catch portion and permit functioning of the spring.

11. In a brake mechanism, a brake element, a catch portion associated therewith, a latch, means normally urging the brake element to operative position, said latch engaging said catch to prevent operation of said means, and means to disengage said latch and catch.

12. In a brake mechanism, a brake element, a catch portion on said brake element, a pivoted latch, said latch having a shoulder adapted to be engaged by said catch portion to maintain the brake element in inoperative position, a spring secured at one end and at its other end connected with said catch portion and acting normally to move said brake element to operative position, a second spring secured at one end and connected at its other end to said latch and serving to normally hold said latch in position to be engaged by said catch, and manually operable means acting through said catch portion to move said latch to release the brake element to permit the application of the brake under the influence of said spring.

13. In an adjustable brake mechanism, a brake element, means normally urging said brake element to operative position, a catch associated with said brake element, a pivoted latch having a shoulder to engage said catch to prevent functioning of said means, means to normally hold said latch in position to engage said catch, means to disengage said shoulder and catch to permit functioning of said first means, the movement of said means relative to said latch being for the purpose of adjustment when setting the brake, and means to compensate for looseness in said parts to insure proper setting of said brake.

14. In a brake mechanism, a brake element, a catch pivoted on said brake element, a pivoted latch, said latch having a shoulder adapted to be engaged by said catch portion to maintain the brake element in inoperative position, means normally holding said latch in position where said shoulder will be engaged by said catch, means acting normally to move said brake element to operative position, and manually operable means acting through said catch portion to move said latch to release the brake element to permit the application of the brake under the influence of said second means.

15. In a brake mechanism, a brake element, a catch, a pivoted latch, said latch having a portion adjacent said catch cut away to provide a shoulder and a guide, means normally urging said brake element to operative position, said shoulder co-operating with said catch to prevent the functioning of said means, said guide co-operating with said catch to insure its proper engagement with the shoulder, and automatic means for disengaging said shoulder and catch to permit functioning of said means.

16. In a brake mechanism, a brake element, a catch, a pivoted latch, said latch having a portion adjacent said catch cut away to provide a shoulder and a guide, means normally urging said brake element to operative position, said shoulder co-operating with said catch to prevent the functioning of said means, said guide co-operating with said catch to insure its proper engagement with the shoulder, and manually operable means acting through said catch to move said latch and separate said catch and shoulder.

17. In a brake mechanism, a brake element, said brake element including a movably mounted body portion, an arm carried by said body portion, a brake pad carried by said arm, a hand piece formed with said body portion, and means to limit movement of the brake element in opposite directions.

18. In a brake mechanism, a brake element, said brake element including a pivotally mounted body portion, an arm carried by said body portion, a brake pad carried by said arm, a hand piece formed with said body portion, and means disposed between said arm and hand piece to limit movement of the brake element in opposite directions.

Signed at Bridgeport, in the county of Fairfield, and State of Connecticut, this 11th day of March, A. D. 1927.

GUSTAVE F. BAHR.